United States Patent
Baker

(10) Patent No.: US 10,268,823 B2
(45) Date of Patent: Apr. 23, 2019

(54) DEVICE, SYSTEM, AND METHOD FOR SECURING EXECUTABLE OPERATIONS

(71) Applicant: Wind River Systems, Inc., Alameda, CA (US)

(72) Inventor: Arlen Baker, Scottsdale, AZ (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 137 days.

(21) Appl. No.: 15/336,343

(22) Filed: Oct. 27, 2016

(65) Prior Publication Data

US 2018/0121644 A1    May 3, 2018

(51) Int. Cl.
| | |
|---|---|
| *G06F 15/177* | (2006.01) |
| *G06F 9/00* | (2006.01) |
| *G06F 21/57* | (2013.01) |
| *G06F 9/4401* | (2018.01) |
| *G06F 21/51* | (2013.01) |

(52) U.S. Cl.
CPC .......... *G06F 21/575* (2013.01); *G06F 9/4406* (2013.01); *G06F 21/51* (2013.01); *G06F 2221/033* (2013.01); *G06F 2221/2141* (2013.01)

(58) Field of Classification Search
CPC ........ G06F 21/57; G06F 21/575; G06F 21/44; G06F 9/4406
See application file for complete search history.

(56) References Cited

U.S. PATENT DOCUMENTS

| | | | |
|---|---|---|---|
| 2007/0156638 A1* | 7/2007 | Vadekar | G06F 21/57 |
| 2009/0271861 A1* | 10/2009 | Yoshida | G06F 21/74 726/17 |

\* cited by examiner

*Primary Examiner* — Xuxing Chen
(74) *Attorney, Agent, or Firm* — Fay Kaplun & Marcin, LLP

(57) ABSTRACT

A device, system, and method secures executable operations through verification of an operation prior to execution. The method performed at an electronic device comprising a processor in an execution state and a memory representable with a memory map includes receiving a request for the operation from an application installed on the electronic device, the request including a location in the memory map. The method includes determining whether the location is within one of at least one address range included in a security policy register generated prior to the execution phase, the at least one address range respectively corresponding to at least one authorized operation. The method includes, when the location is within one of the at least one address range, servicing the request to perform the operation.

20 Claims, 4 Drawing Sheets

DEVICE, SYSTEM, AND METHOD FOR SECURING EXECUTABLE OPERATIONS

BACKGROUND INFORMATION

An electronic device may include a processor that executes a variety of different types of computer-executable instructions from various programs, applications, modules, etc. (hereinafter collectively referred to as "applications"), to perform various functionalities. The electronic device may further include storage components, such as, a disk drive that enables data to be stored in a general manner including the data associated with the various applications. When the applications are executed, corresponding computer-executable instructions may request temporary storage of some amount of data during execution of the instructions on, for example, a random access memory (RAM).

There are a variety of different types of applications that may be executed on the processor of the electronic device. Furthermore, the applications may have a plurality of different operations that are performed. A conventional approach in differentiating the types of operations is to define levels or rings such that a state of the processor further defines whether the operation may be executed. That is, the processor may utilize different processing modes that place restrictions on the types and also scope of operations that may be performed at a given time. For example, the processor may define a privileged state in which only a subset of the operations may be performed.

The electronic device may be subject to a malicious attack that installs malicious software. That is, the computer-executable instructions that are executed by the processor may encompass the intended instructions or intended operations, such as, for example, the operating system (OS) and associated operations of the OS, but may also include unintended instructions, such as, for example, those from malicious software (malware), and/or associated operations of the malicious software. The malicious software and operations may be configured to bypass any mode restriction such as forcing the processor to grant privileges thereto. Thus, even with the various modes available to the processor, the malicious software and operations may still be executed.

SUMMARY

The exemplary embodiments are directed to a method for verification of an operation prior to execution, comprising: at an electronic device comprising a processor in an execution state and a memory representable with a memory map: receiving a request for the operation from an application installed on the electronic device, the request including a location in the memory map; determining whether the location is within one of at least one address range included in a security policy register generated prior to the execution phase, the at least one address range respectively corresponding to at least one authorized operation; and when the location is within one of the at least one address range, servicing the request to perform the operation.

The exemplary embodiments are directed to an electronic device, comprising: a memory configured to store at least one application installed on the electronic device, the memory representable with a memory map; and a processor in an execution state receiving a request for an operation from one of the applications, the request including a location in the memory map, the processor determining whether the location is within one of at least one address range included in a security policy register generated prior to the execution phase, the at least one address range respectively corresponding to at least one authorized operation, and when the location is within one of the at least one address range, the processor servicing the request to perform the operation.

The exemplary embodiments are directed to a method, comprising: at an electronic device comprising a processor prior to an execution state and a memory representable with a memory map: receiving at least one identity corresponding to at least one authorized operation and at least one address range corresponding to the at least one authorized operation, the at least one address range including at least one location in the memory map; and generating a security policy register including the at least one authorized operation and the at least one address range, wherein a request for an operation during the execution state includes a request location in the memory map, the operation being serviced when the request location is within one of the at least one address range in the security policy register.

DETAILED DESCRIPTION

Figure 1:
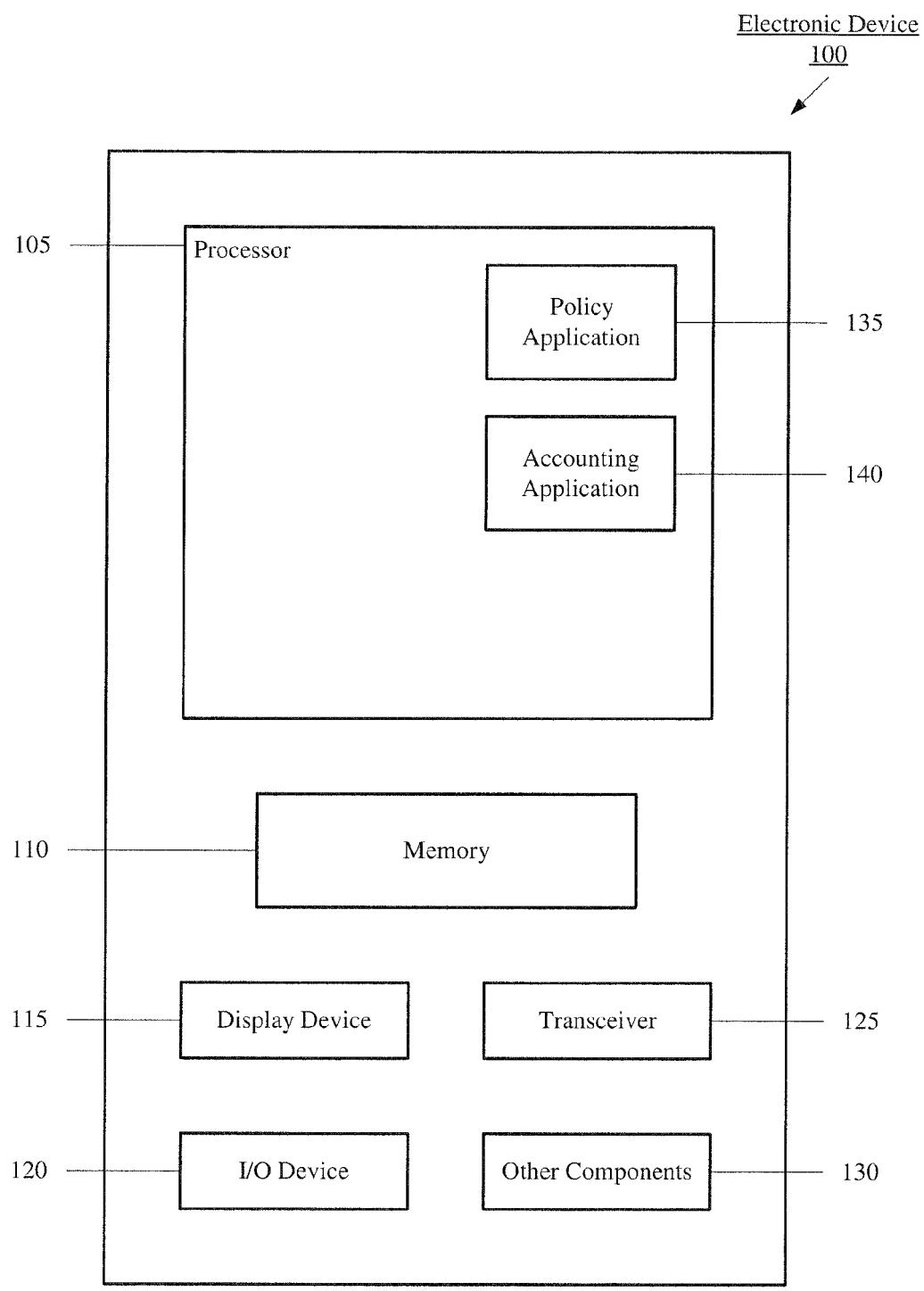
FIG. 1 shows an electronic device according to the exemplary embodiments.

The exemplary embodiments may be further understood with reference to the following description and the related appended drawings, wherein like elements are provided with the same reference numerals. The exemplary embodiments are related to a device, a system, and a method for securing operations through validation of the operations. Specifically, the exemplary embodiments relate to a mechanism utilizing a known security parameter that validates a request for the operation. The known security parameter may relate to an address in a memory map of a memory component in which data associated with an application that is attempting to perform the operation is being stored.

The exemplary embodiments provide a security mechanism in which an operation is executed by first validating whether a request associated with the operation originates from an application that is allowed to request operations. That is, the request is validated as to whether the request is genuinely allowed to be performed given the state of the processor. Specifically, the operation and the application from which the operation is requested are stored in a memory and have an associated region in a memory map of the memory. For example, the application may "own" a specific physical address range in the memory. Through knowledge of the regions in the memory map of the operations/applications and associating these regions in a validation list, a request for an operation may be validated. In this manner, the security mechanism according to the exemplary embodiments define and implement a fine grained security policy on the usage of the operations performed by the processor that may also be considered relevant to security issues.

Initially, it is noted that the exemplary embodiments are described with regard to a boot phase or sequence. Those skilled in the art will understand the importance of maintaining a secure boot phase such that only intended operations are performed such as those related to the operating system while unintended or malicious operations are not performed. However, the use of the boot phase is only exemplary. Those skilled in the art will appreciate that the exemplary embodiments may be utilized for any phase of the processor in which unintended operations are to be prevented from being performed.

FIG. 1 shows components of an electronic device 100 according to the exemplary embodiments. The electronic device 100 may be configured to execute applications and perform operations thereof using computer-executable instructions. The electronic device 100 may also be configured with the security mechanism according to the exemplary embodiments in performing the operations. As will be described in further detail below, the validation of a memory location in a memory map may confirm whether an operation is to be performed. The electronic device 100 may represent any electronic device such as, for example, a portable device (e.g., a cellular phone, a smartphone, a tablet, a phablet, a laptop, a wearable, etc.) or a stationary device (e.g., desktop computer). The electronic device 100 may include a processor 105 and a memory 110. The electronic device 100 may further optionally include one or more of the following: a display device 115, an input/output (I/O) device 120, a transceiver 125, and other suitable components 130, such as, for example, a portable power supply, an audio I/O device, a data acquisition device, ports to electrically connect the electronic device 100 to other electronic devices, etc.

The processor 105 may be configured to execute computer-executable instructions for operations from a plurality of applications that provide various functionalities to the electronic device 100. For example, the plurality of applications may include programs including an operating system, firmware programs, user operated programs (e.g., a browser, a word processor, a short messaging service (SMS) text program, an email program, etc.), etc. In another example and according to the exemplary embodiments, the plurality of applications may further include a policy application 135 and an accounting application 140. As will be described in further detail below, the policy application 135 is configured to define a list of allowed operations, store the corresponding memory locations for the allowed operations, and verify whether a request corresponds to one of the allowed operations. The accounting application 140 is configured to log each of the requests for operations and whether the request was serviced.

It should be noted that the applications executed by the processor 105 are only exemplary. In a first example, the processor 105 may be an applications processor. In another example, the functionalities described for the applications may also be represented as a separately incorporated component of the electronic device 100 (e.g., an integrated circuit with or without firmware), or may be a modular component coupled to the electronic device 100. The functionality or functionalities may also be distributed throughout multiple components of the electronic device 100.

The memory 110 may be a hardware component configured to store data related to the functionalities performed by the electronic device 100. The memory 110 may provide a storage location for data to be written and remain stored even when power is disconnected from the memory 110. For example, the memory 110 may be a disk drive. Thus, the above noted applications may be installed on the electronic device 100. When the applications are installed, the data corresponding thereto including the installation data may be stored in perpetuity on the memory 110. Specifically, the applications may be stored on a particular physical location on the memory 110. Thus, if the space of the memory 110 is shown on a corresponding memory map, the location of data for a particular application may be identified.

It is noted that the memory 110 may be part of a storage arrangement that may include other types of storage components such as a processing storage component (e.g., a Random Access Memory (RAM)). Those skilled in the art will understand that the processing storage component may provide an improved efficiency of data retrieval for data stored thereon but any data stored on the RAM is erased when power is disconnected thereto. Although the exemplary embodiments are described with regard to the memory 110 being a disk drive, it is noted that the use of a disk drive is only exemplary. Even with the volatile nature of the processing storage component, those skilled in the art will understand that the exemplary embodiments may be adapted or modified for use with the processing storage component as well. For example, a memory map and corresponding locations may be identified and updated in a more constant manner for use with the security mechanism of the exemplary embodiments.

The display device 115, the I/O device 120, and the transceiver 125 may provide conventional functionalities. Specifically, the display device 115 may be a hardware component configured to provide to a user a visual representation corresponding to the data. The I/O device 120 may be a hardware component configured to receive inputs from the user and output corresponding data. The transceiver 125 may enable a connection or a communication to be established between the electronic device 100 and another electronic device.

According to the exemplary embodiments, the security mechanism may include separate functionalities that provide features used in combination to ensure that requests for operations are validated such that allowed operations are performed while denied operations are prevented from being performed. Specifically, the security mechanism may utilize a first feature in which operations are identified as being allowed to be performed during a particular phase of the processor. The security mechanism may utilize a second feature in which operations are verified by validating whether the operation and/or the application requesting the operation was identified in the first functionality.

As described above, the policy application 135 is configured to perform a plurality of functionalities. In a first functionality, the policy application 135 may define a list of allowed operations in a security policy register. Specifically, this functionality may relate to the first feature of the security mechanism. Accordingly, the policy application 135 may be configured to receive information from allowed operations and/or applications about address ranges in the memory map to be stored in the security policy register.

As noted above, the exemplary embodiments are described with regard to a trusted boot phase such as with an operating system. Accordingly, the types of operations and/or applications that may be included in a security policy register of allowed operations and/or applications may be associated with the trusted boot phase. For example, the operations may be for a reboot, a shutdown, a hash, a system management, a memory management, a random number, a cryptographic key access, a security engine access, a security fuse access, a unique identity, etc. The operations that are included in the security policy register of the security mechanism may be fixed. That is, only the operations associated with the trusted boot phase may be added to the security policy while any other operation may be excluded. Through the secured boot phase, the security mechanism of the exemplary embodiments may be implemented in hardware and provide an immutable security policy at a lowest level of operation (i.e., the operations of the trusted boot phase).

It is noted that the population of the security policy register may be an additional functionality that is performed. Accordingly, malicious applications may not be configured to add operations to the security policy register. Furthermore, by implementing the population in hardware, malicious applications which are software-based may not be allowed to populate the security policy register. Therefore, the exemplary embodiments provide a mechanism where only allowed or intended operations are populated in the security policy register.

It is further noted that the use of the trusted boot phase is only exemplary and the exemplary embodiments may be utilized for any phase in which the processor 105 is operating. It is also noted that the exemplary embodiments may be modified for the security policy register to be updated. However, in such a scenario, the exemplary embodiments may utilize a significant and comprehensive process to ensure that only allowed operations and/or applications are used in updating the security policy to maintain the level of security corresponding to a fixed security policy register.

According to the exemplary embodiments, the policy application 135 may perform the first functionality during the trusted boot phase. Specifically, the policy application 135 may populate a list of allowed operations and/or applications with corresponding address ranges on a memory map representing a location in the memory 110 on which the application is stored. That is, the security policy register may be generated. With knowledge of which operations and/or applications are allowed through implementation in the hardware, the policy application 135 may receive the address range in the memory map from which each of the operations is being requested by the applications. In this manner, the policy application 135 may store the operation with the corresponding address in the security policy register.

The first functionality of the policy application 135 according to the exemplary embodiments may utilize various aspects to ensure the highest level of security. For example, the policy application 135 may prevent the security policy register from being modified. Thus, once the policy application 135 has generated the security policy register during the trusted boot phase, the security policy register remains fixed throughout its use. In another example, the policy application 135 may prevent the security policy register from being modified for a duration of time such as until a following power cycle. Thus, the security policy register may be generated for each trusted boot phase when a power cycle has been started.

It should be noted that the use of the fixed security policy register is only exemplary. In a substantially similar manner as the allowed operations and/or applications, the exemplary embodiments may utilize a security policy register that is modified. However, also in a substantially similar manner as the allowed operations and/or applications, an update to the security policy register may require that a comprehensive process to allow the update.

According to a second functionality, the policy application 135 may also be configured to verify whether a request for an operation corresponds to one of the allowed operations in the security policy register. The second functionality may be performed after the first functionality has been performed such that a security policy register is available for use by the policy application 135. Thus, during execution in which operations are performed, the policy application 135 may provide an intermediary position between the requesting application and the executing processor component. Specifically, the application in which an operation is to be performed may transmit a request for the operation which is received by the policy application 135. The request may include a location in the memory map in which the application requesting the operation is being stored. Accordingly, the policy application 135 may verify the requested operation against the operations included in the security policy register to determine whether the request should be serviced or rejected.

When the policy application 135 determines the location on the memory map from which the request for the operation originates, the policy application 135 may further determine whether the location corresponds to any of the address ranges included in the security policy register. For example, security engine access operation may be an operation included in the security policy register. Thus, the security engine access operation may have a corresponding address range in the memory map of the memory 110 that is stored in the security policy register. The operation being requested may also be the security engine access operation in which the request includes the location in the memory map from which the request originates. The policy application 135 may therefore determine that the location of the request is within the memory range of an acceptable operation listed in the security policy register. When the policy application 135 determines that the request is acceptable using the security policy register, the policy application 135 may service the request by passing the request to the appropriate component of the processor 105. The processor 105 may utilize known mechanisms in performing the requested operation.

Figure 2:
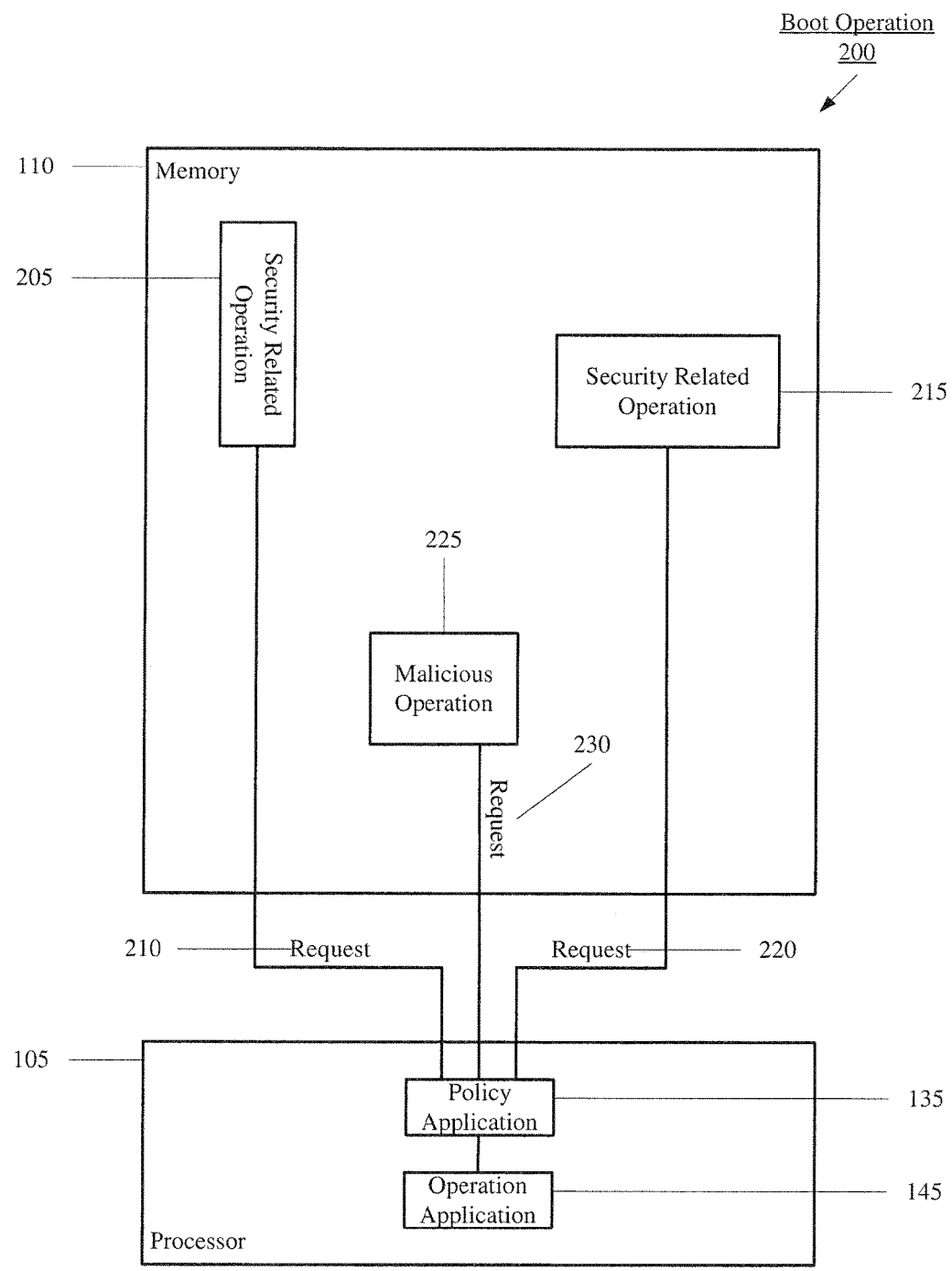
FIG. 2 shows a boot operation according to the exemplary embodiments.

FIG. 2 shows a boot operation 200 according to the exemplary embodiments. The boot operation 200 may relate to the trusted boot phase in which operations are requested to be performed. Accordingly, the operations that are allowed and intended to be performed may be security related. In describing the boot operation 200, it may be assumed that there is a first security related operation 205 and a second security related operation 205 as well as a malicious operation 225 that are currently stored in the memory 110.

As described above, the second functionality of the policy application 135 may be performed after the first functionality has been performed in which the security policy register has been generated. For the boot operation 200, the security policy register may have been generated in which the security related operation 205, the security related operation 215, and other allowed operations are populated in the security policy register. Furthermore, during the trusted boot phase, the address range for the operations populating the security policy register may have been determined and included in the security policy register. Specifically, the address range for the security related operation 205 and the address range for the security related operation 215 may have been included in the security policy register.

During execution, the second functionality of the policy application 135 may be performed. Specifically, the security related operation 205 may have a request 210 that is transmitted to the policy application 135 while the security related operation 215 may have a request 220 that is transmitted to the policy application 135. The request 210 and the request 220 may each include a location in the memory map from which the requests 210, 220 originate. The policy application 135 may determine that the location of the request 210 originates from the security related operation 205 by the address range associated therewith. A substantially similar determination may be found for the request 220. In this manner, the policy application 135 may validate the requests 210, 220 using the security policy register. The policy application 135 may service the requests 210, 220 by forwarding the requests 210, 220 to the appropriate component of the processor 105.

The boot operation 200 also shows the malicious operation 225. For example, a malicious application may be a virus, malware, a worm, etc. that has been installed on the electronic device 100. The malicious application may be attempting to have the malicious operation 225 performed. As those skilled in the art will understand, the malicious operation 225 may be performed in a variety of manners, particularly to bypass conventional security measures. For example, the malicious operation 225 may mask itself as a security related operation or other allowed operation. In a particular example, if the security related operation 205 is the security engine access, the malicious operation 225 may be configured to also be the security engine access. Thus, under conventional approaches such as a privileged state which accepts operations identifying itself as a privileged operation, the malicious operation 225 would be allowed to be performed. In this manner, the malicious operation 225 may be performed using conventional approaches although not intended to be performed.

However, according to the exemplary embodiments, the location in the memory map is also verified to validate whether a request for an operation is to be serviced or performed. In this case, the malicious operation 225 may transmit a request 230 to the policy application 135 since the policy application 135 is configured to receive any request for operations prior to transmitting the request to the appropriate component of the processor 105. The request 230 may have a location from which the request 230 originates. Specifically, the location may be within an address range of the malicious operation 225. Since the location of the request 230 does not coincide with any of the address ranges included in the security policy register, the policy application 135 may determine that the request 230 is not an allowed operation. Accordingly, the policy application 135 may reject the request and prevent any forwarding of the request to the appropriate component of the processor 105.

It should be noted that the policy application 135 may maintain the security policy register with specific definitions. That is, the security policy register may store the address range with the specific allowed operation. Thus, the verification performed in the second functionality of the policy application 135 may initially determine whether the location in the request is within any of the address ranges in the security policy register and subsequently determine whether the operation also coincides with the specific operation associated with a matched address range. Therefore, even if the malicious operation 225 is configured to alter the location of the memory map in the request, there is a low to no probability that the malicious operation 225 will bypass the security mechanism of the exemplary embodiments.

The exemplary embodiments may utilize further functionalities while performing the first and second functionalities of the policy application 135. Specifically, the security mechanism according to the exemplary embodiments may utilize the accounting application 140. As described above, the accounting application 140 is configured to log each of the requests for operations and whether the request was serviced. Specifically, the accounting application 140 may account for a callback routine to log events for both authorized (e.g., allowed) and unauthorized (e.g., rejected) requested operations. When related to the trusted boot phase, the callback and/or interrupt routine of an accounting routine may log security-related events. That is, the operations requested during the trusted boot phase may be accounted. The accounting application 140 that uses the accounting routine may register callbacks and/or interrupts to be registered to denote the security-related events for each of the requests for operations.

By logging and accounting for all requests of operations, the accounting application 140 may provide a further functionality such as a cleaning functionality. Specifically, the accounting application 140 may utilize information from the policy application 135 to determine whether or not any malicious application requested an operation to be performed. As the accounting application 140 provides an accounting routine to track and account for all requests of operations, the accounting application 140 may determine the malicious application that requested the malicious operation 225. Once the accounting application 140 has identified the malicious application via the request for the malicious operation 225 as well as an identification of a location in the memory map, the accounting application 140 and/or a separate cleaning application may clean the malicious application from the electronic device 100.

Figure 3:
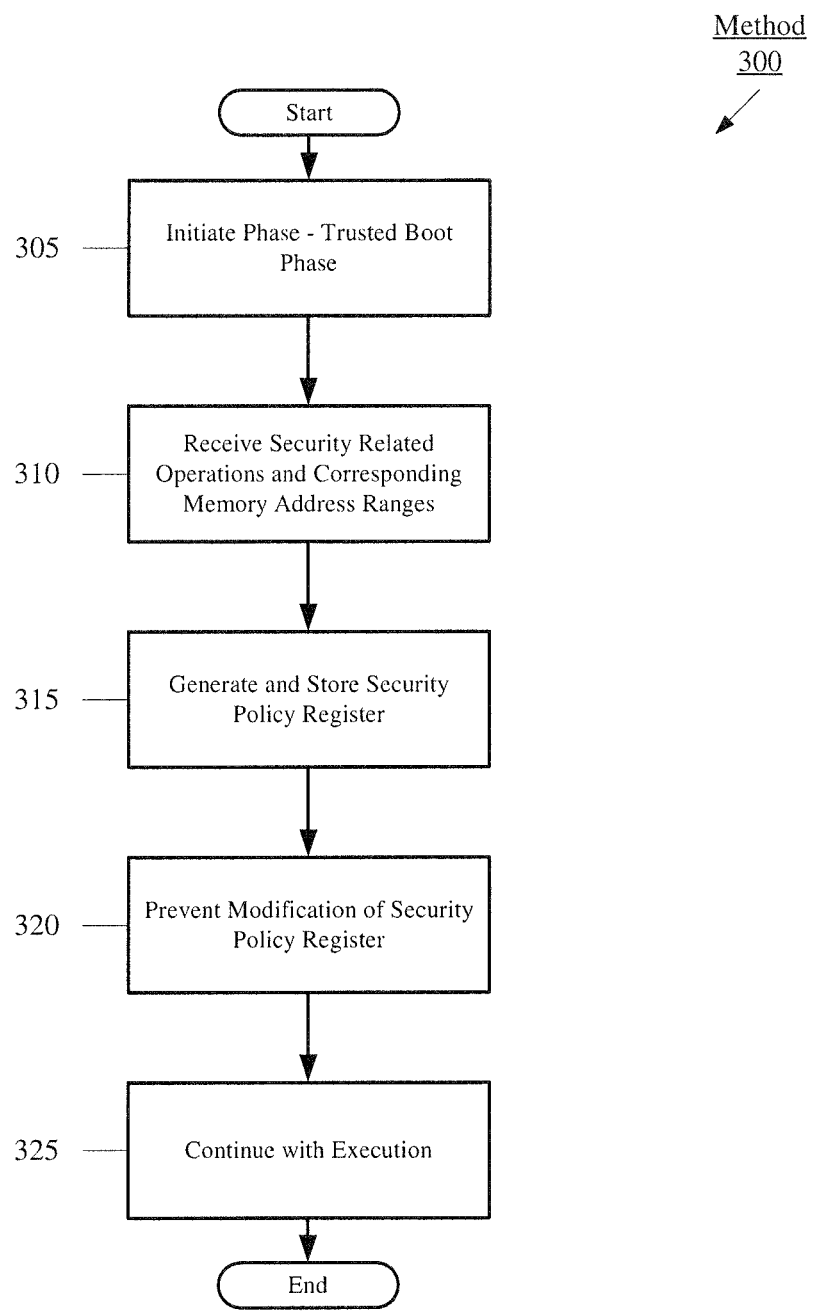
FIG. 3 shows a method for mapping memory addresses of verified operations according to the exemplary embodiments.

FIG. 3 shows a method 300 for mapping memory addresses of verified operations according to the exemplary embodiments. The method 300 may relate to the first functionality of the policy application 135 in which operations and/or applications along with corresponding address ranges in a memory map are populated in a security policy register. Accordingly, the method 300 will be described with regard to the electronic device 100 of FIG. 1 and the boot operation 200 of FIG. 2.

As described above, the first functionality of the policy application 135 may be performed during the trusted boot phase. Specifically, the method 300 may relate to an additional step created for the trusted boot phase in which the first functionality of the policy application 135 is performed. Furthermore, as the operations and/or application requesting the operations are associated with the trusted boot phase and the method 300 being implemented in hardware, the security policy register may be generated in a secure manner where only the operations and/or applications correspond to intended operations performed during the trusted boot phase.

In step 305, the processor 105 initiates the phase of the processor. Specifically, the processor 105 initiates the trusted boot phase. As the trusted boot phase relates to a set of operations that place the processor 105 into a standard, predetermined runtime environment, the processor 105 may utilize allowed operations to be performed to achieve the runtime environment. Despite other security measures being in effect such as a privileged state which allows these particular allowed operations to be performed, malicious applications may still have operations performed such as mimicking a request of an allowed operation.

In step 310, the processor 105 receives the identities of security related operations and corresponding address ranges of the security related operations in a memory map of the memory 110 where the applications requesting the security related operations are stored. For example, the processor 105 may receive the identities of the security related operations 205, 210 with their corresponding address ranges in the memory map of the memory 110. The address ranges may further relate to the application that requests the operation. In step 315, the processor 105 generates and stores the identities of the security related operations 205, 210 and their corresponding address ranges in the memory map of the memory 110 in the security policy register.

In step 320, the processor 105 prevents modification of the security policy register. As described above, the security policy register may be fixed such that the security policy register is prevented from being changed in any way, especially by a malicious application. Through fixing, the security policy register may provide the necessary guarantee that the second functionality of the policy application 135 is performed to ensure only allowed operations be performed. In step 325, the processor 105 continues to the execution of the trusted boot phase in which operations are requested and performed.

Figure 4:
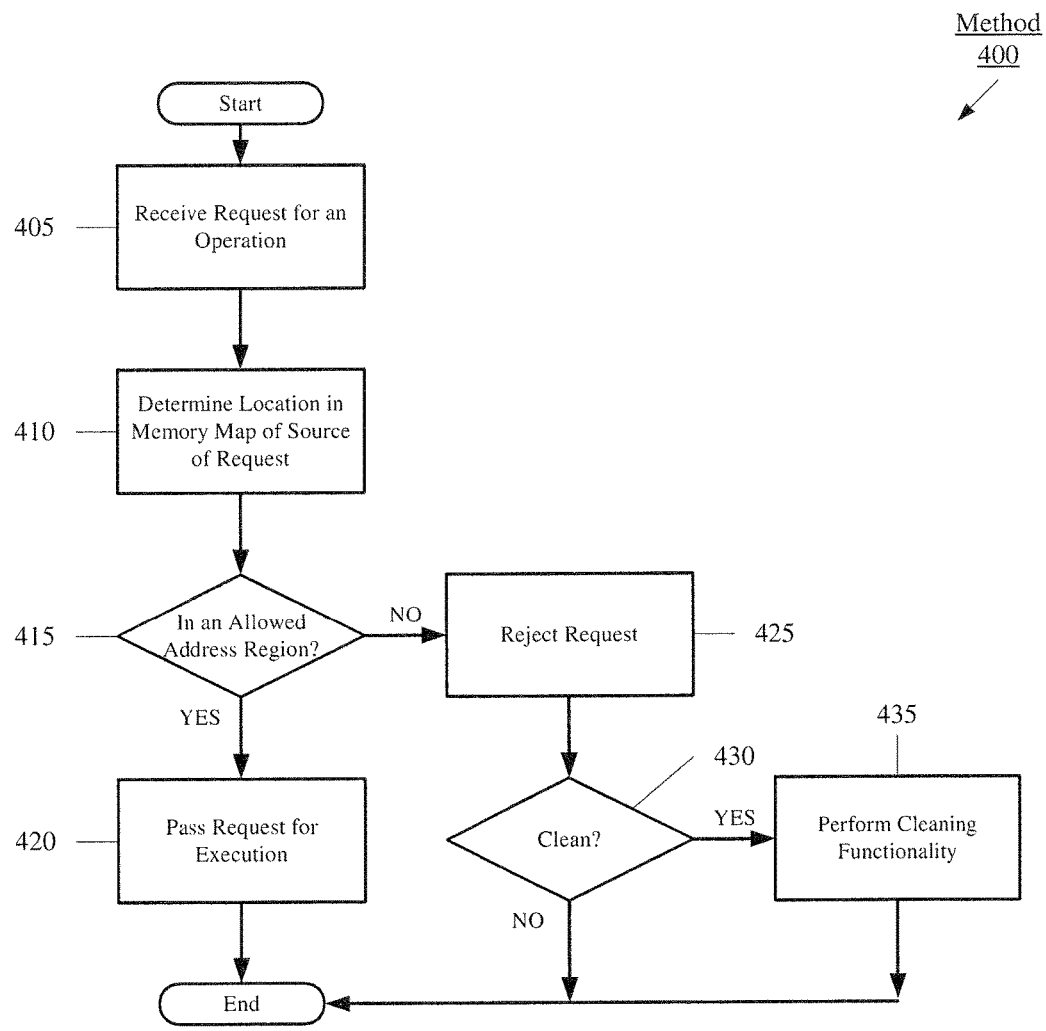
FIG. 4 shows a method for determining whether an operation is verified according to the exemplary embodiments.

FIG. 4 shows a method 400 for determining whether an operation is verified according to the exemplary embodiments. The method 400 may relate to the second functionality of the policy application 135 in which operations are requested by applications where the request for the operation identifies a location in a memory map in which the application is stored. The method 400 also relates to validating the request to determine whether to service the request or reject the request. Accordingly, the method 400 will be described with regard to the electronic device 100 of FIG. 1 and the boot operation 200 of FIG. 2.

In step 405, the processor 105 receives a request for an operation to be performed by an application. For example, during the trusted boot phase, the operations may relate to those performed to attain the runtime environment. Specifically, the requests may include the request 210 for the security related operation 205, the request 220 for the security related operation 215, and the request 230 for the malicious operation 225.

In step 410, the processor 105 determines the location in the memory map from which the request for the operation originates. Specifically, the location may relate to the portion of address range corresponding to the application that is requesting the operation. As illustrated in the memory 110 of the boot operation 200, the location may be in a variety of different portions of the memory map representing the physical location in the memory 110.

In step 415, the processor 105 determines whether the location received in the request corresponds to an allowed address range in the security policy register. For example, the security related operations 205, 210 have locations in the memory map that fall within address ranges included in the security policy register. Thus, when the processor 105 determines the correspondence in the security policy register, in step 420, the processor 105 passes the request for execution by the processor 105.

However, if a malicious application has been installed and the malicious operation 225 is being requested, the location for the malicious operation 225 may not be within any address range included in the security policy register. As described above, the security policy register may be hardware implemented which prevents a software application such as the malicious application to enter an address range into the security policy register. Thus, even when the malicious operation 225 emulates an allowed operation, the processor 105 may determine whether the operation that would be allowed in name only is genuinely allowed to be performed through verification of the memory location. Thus, when the processor 105 determines no correspondence in the security policy register, in step 425, the processor rejects the request for execution.

In step 430, the processor 105 determines whether the rejected request entails cleaning the malicious application that transmitted the request. As described above, the processor 105 may utilize the accounting application 140 that tracks and accounts for all authorized and unauthorized operations that are requested. Through identification of the malicious operation 225 being rejected and the known location of the malicious operation, a cleaning functionality may allow for the malicious application that transmitted the request to be cleaned. Thus, in step 435, the cleaning functionality may be performed to remove the malicious application.

It is noted that the method 400 may include additional features. For example, the verification process described above relates to identifying whether the location of the request falls within an address range included in the security policy register. The security policy register may also identify the types of operations that may be requested by a particular address range. Accordingly the processor 105 may also determine whether the request is for a specific operation. Although the location for the request may fall within an acceptable address range, the processor 105 may also verify whether the specific operation is included for the acceptable address range to which the location of the request falls.

It is again noted that the above description relating to using the trusted boot phase is only exemplary. The exemplary embodiments may be configured to be used for any phase or state of the processor 105. For example, a plurality of security policy registers may be generated for each phase or state of the processor 105 such that a respective security policy register is used based on the state of the processor 105. In this manner, the state of the processor 105 also defines the operations that are authorized or unauthorized.

The exemplary embodiments provide a mechanism to ensure that authorized operations are performed. By first defining the operations that are authorized and associating these operations to a respective address range in a memory map representing a memory, a security policy register may be populated. Subsequently, during execution, requests for operations may be verified by identifying the location in the memory map from which the request originates and determining whether the location falls within the address ranges in the security policy register. In this manner, only predetermined, authorized operations may be performed through verification of the memory location.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method for verification of an operation prior to execution, comprising:
   at an electronic device comprising a processor in an execution state and a memory representable with a memory map:
   receiving a request for the operation from an application installed on the electronic device, the request including a location in the memory map;
   determining whether the location is within one of at least one address range included in a security policy register generated prior to the execution phase, the at least one address range respectively corresponding to at least one authorized operation; and
   when the location is within one of the at least one address range, servicing the request to perform the operation.

2. The method of claim 1, further comprising:
   when the location is outside each of the at least one address range, rejecting the request.

3. The method of claim 2, further comprising:
   accounting for the request using an accounting routine to register a request event.

4. The method of claim 3, further comprising:
   performing a cleaning of a source of the operation based on the request event.

5. The method of claim 1, further comprising:
   prior to the execution phase, receiving at least one identity corresponding to the at least one authorized operation and the at least one address range; and
   generating the security policy register.

6. The method of claim 5, wherein the security policy register is prevented from being modified once the execution state begins.

7. The method of claim 6, wherein the security policy register is prevented from being modified until a following power cycle.

8. The method of claim 1, wherein the execution state is a part of a phase of the processor.

9. The method of claim 8, wherein the phase is a trusted boot phase.

10. The method of claim 9, wherein the at least one authorized operation is a reboot operation, a shutdown operation, a cryptographic operation, a hash operation, a system management operation, a memory management operation, a random number operation, a cryptographic key access operation, a security engine access operation, a security fuse access operation, a unique identity operation, and a combination thereof.

11. An electronic device, comprising:
    a memory configured to store at least one application installed on the electronic device, the memory representable with a memory map; and
    a processor in an execution state receiving a request for an operation from one of the applications, the request including a location in the memory map, the processor determining whether the location is within one of at least one address range included in a security policy register generated prior to the execution phase, the at least one address range respectively corresponding to at least one authorized operation, and when the location is within one of the at least one address range, the processor servicing the request to perform the operation.

12. The electronic device of claim 11, wherein, when the location is outside each of the at least one address range, the processor further rejects the request.

13. The electronic device of claim 12, wherein the processor further accounts for the request using an accounting routine to register a request event.

14. The electronic device of claim 13, wherein the processor further performs a cleaning of a source of the operation based on the request event.

15. The electronic device of claim 11, wherein, prior to the execution phase, the processor further receives at least one identity corresponding to the at least one authorized operation and the at least one address range and generates the security policy register.

16. The electronic device of claim 15, wherein the security policy register is prevented from being modified once the execution state begins.

17. The electronic device of claim 16, wherein the security policy register is prevented from being modified until a following power cycle.

18. The electronic device of claim 11, wherein the execution state is a part of a phase of the processor.

19. The electronic device of claim 18, wherein the phase is a trusted boot phase.

20. A method, comprising:
    at an electronic device comprising a processor prior to an execution state and a memory representable with a memory map:
    receiving at least one identity corresponding to at least one authorized operation and at least one address range corresponding to the at least one authorized operation, the at least one address range including at least one location in the memory map; and
    generating a security policy register including the at least one authorized operation and the at least one address range,
    wherein a request for an operation during the execution state includes a request location in the memory map, the operation being serviced when the request location is within one of the at least one address range in the security policy register.

* * * * *